(12) United States Patent
Hsu et al.

(10) Patent No.: US 7,898,413 B2
(45) Date of Patent: Mar. 1, 2011

(54) ANTI-TAMPER PROTECTED ENCLOSURE

(75) Inventors: Steve Hsu, Tao-Yuan (TW); Daniel Hong, Taipei (TW); Kenji Chao, Taipei (TW); Douglas Manchester, Rocklin, CA (US)

(73) Assignee: Verifone, Inc., San Jose, CA (US)

( * ) Notice: Subject to any disclaimer, the term of this patent is extended or adjusted under 35 U.S.C. 154(b) by 996 days.

(21) Appl. No.: 11/627,166

(22) Filed: Jan. 25, 2007

(65) Prior Publication Data

US 2008/0180245 A1    Jul. 31, 2008

(51) Int. Cl.
*G08B 13/14*   (2006.01)
*G08B 21/00*   (2006.01)

(52) U.S. Cl. ............... 340/571; 340/568.1; 340/652

(58) Field of Classification Search .... 340/568.1–568.4, 340/568.8, 571, 572.1–572.8, 652
See application file for complete search history.

(56) References Cited

U.S. PATENT DOCUMENTS

| | | | |
|---|---|---|---|
| 3,818,330 A * | 6/1974 | Hiroshima et al. | 324/549 |
| 5,627,520 A * | 5/1997 | Grubbs et al. | 340/572.1 |
| 5,675,319 A | 10/1997 | Rivenberg et al. | |
| 5,861,662 A | 1/1999 | Candelore | |
| 5,877,547 A | 3/1999 | Rhelimi et al. | |
| 5,998,858 A | 12/1999 | Little et al. | |
| 6,396,400 B1 | 5/2002 | Epstein, III et al. | |
| 6,438,825 B1 | 8/2002 | Kuhn | |
| 6,646,565 B1 | 11/2003 | Fu et al. | |
| 6,830,182 B2 | 12/2004 | Izuyama et al. | |
| 6,853,093 B2 | 2/2005 | Cohen et al. | |
| 6,874,092 B1 | 3/2005 | Motoyama et al. | |
| 6,917,299 B2 | 7/2005 | Fu et al. | |
| 7,170,409 B2 | 1/2007 | Ehrensvard et al. | |
| 2004/0120101 A1 | 6/2004 | Cohen et al. | |
| 2005/0081049 A1 | 4/2005 | Nakayama et al. | |
| 2005/0184870 A1 | 8/2005 | Galperin et al. | |
| 2005/0263793 A1* | 12/2005 | Cornelius | 257/200 |
| 2006/0049255 A1 | 3/2006 | von Mueller et al. | |
| 2006/0049256 A1 | 3/2006 | von Mueller et al. | |
| 2006/0192653 A1 | 8/2006 | Atkinson et al. | |

FOREIGN PATENT DOCUMENTS

| | | |
|---|---|---|
| EP | 0375545 | 6/1990 |
| JP | 2002108711 | 4/2002 |
| WO | 2005/086546 | 9/2005 |

* cited by examiner

*Primary Examiner* — Benjamin C Lee
*Assistant Examiner* — Michael Shannon
(74) *Attorney, Agent, or Firm* — Fish & Richardson P.C.

(57) ABSTRACT

A device for containing sensitive data including a housing, an anti-tamper protected enclosure located within the housing and being adapted to contain the sensitive data, anti-tamper protection circuitry located within the anti-tamper protected enclosure and at least one ball grid array arranged within the housing and mounted on an outer surface of the anti-tamper protected enclosure and electrically coupled to the anti-tamper protection circuitry for protecting against unauthorized access to the interior of the anti-tamper protected enclosure.

20 Claims, 4 Drawing Sheets

ANTI-TAMPER PROTECTED ENCLOSURE

FIELD OF THE INVENTION

The present invention relates to electronic devices containing sensitive data generally and more particularly to tamper-protected point of sale terminals.

BACKGROUND OF THE INVENTION

The following U.S. patent documents are believed to represent the current state of the art: U.S. Pat. Nos. 6,646,565; 6,917,299 and 6,853,093. The disclosures of these patent documents are hereby incorporated herein by reference.

SUMMARY OF THE INVENTION

The present invention seeks to provide an improved security system for electronic devices, especially tamper-protected point of sale terminals and other devices containing sensitive information, such as personal data. For the purposes of the present description and claims, the term "point of sale terminals" includes, inter alia, PIN pads, electronic cash registers, ATMs, card payment terminals and the like.

There is thus provided in accordance with a preferred embodiment of the present invention a device for containing sensitive data including a housing, an anti-tamper protected enclosure located within the housing and being adapted to contain the sensitive data, anti-tamper protection circuitry located within the anti-tamper protected enclosure and at least one ball grid array device arranged within the housing, mounted on an outer surface of the anti-tamper protected enclosure and electrically coupled to the anti-tamper protection circuitry for protecting against unauthorized access to the interior of the anti-tamper protected enclosure.

The term "ball grid array device" refers to an electrical circuit device enclosed in a ball grid array package.

Preferably, the device also includes a confidential data storage element located within the anti-tamper protected enclosure. Additionally or alternatively, the device also includes a data entry element mounted in the housing. The ball grid array device preferably includes wire-bonded circuitry.

Preferably, the anti-tamper protection circuitry is operative, in the event of physical tampering with at least one of the at least one ball grid array device, to perform at least one of the following actions: generate an alarm indication, disable the device and erase the sensitive data.

In accordance with a preferred embodiment the device is a point of sale terminal.

There is also provided in accordance with another preferred embodiment of the present invention an anti-tamper protected enclosure including anti-tamper protection circuitry located within the anti-tamper protected enclosure and at least one ball grid array device mounted on an outer surface of the anti-tamper protected enclosure and electrically coupled to the anti-tamper protection circuitry for protecting against unauthorized access to the interior of the anti-tamper protected enclosure. Preferably, the ball grid array device comprises wire-bonded circuitry.

Preferably, the anti-tamper protected enclosure includes at least one grid which is electrically coupled to the anti-tamper protection circuitry. Additionally, the anti-tamper protection circuitry is coupled to the at least one conductor network via the at least one ball grid array device. Additionally, the anti-tamper protection circuitry is coupled to the at least one conductor network by electrical connections extending through vias which are physically protected by the at least one ball grid array device.

Preferably, the physical location of the at least one ball grid array device is selected to provide physical protection to at least one electrical connection within the anti-tamper protected enclosure. Additionally or alternatively, the at least one ball grid array device includes balls which are not electrically connected to the anti-tamper protection circuitry.

Preferably, the anti-tamper protected enclosure includes at least one flexible printed circuit board. Additionally or alternatively, the anti-tamper protected enclosure includes at least one rigid printed circuit board.

Preferably, the anti-tamper protected enclosure also has a confidential data storage element located within.

Preferably, the anti-tamper protected circuitry includes a comparison circuit. Additionally or alternatively, the anti-tamper protection circuitry is operative, in the event of physical tampering with at least one of the at least one ball grid array device, to generate an alarm indication.

BRIEF DESCRIPTION OF THE DRAWINGS

The present invention will be understood and appreciated more fully from the following detailed description taken in conjunction with the drawings in which.

DETAILED DESCRIPTION OF PREFERRED EMBODIMENTS

Figure 1:
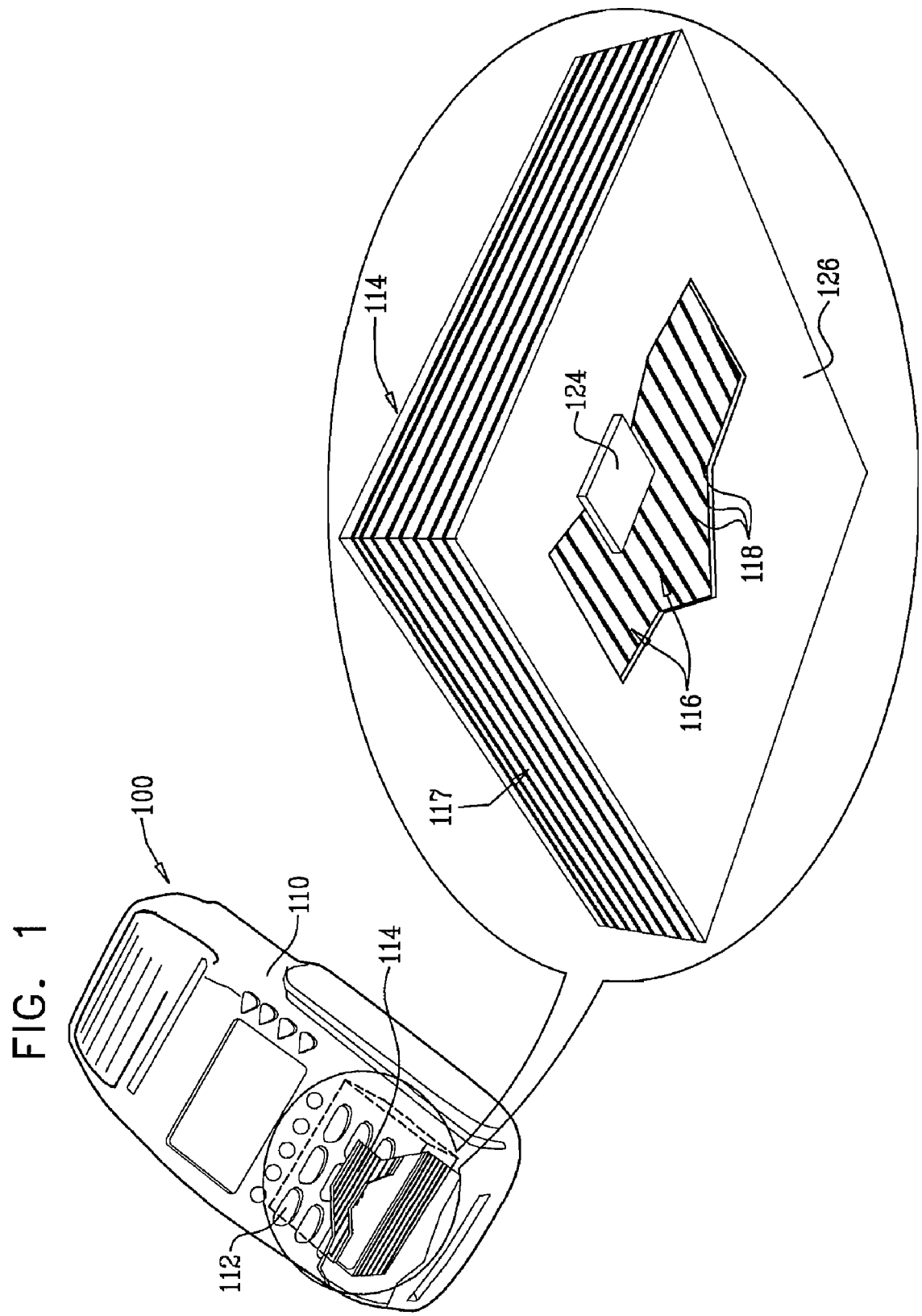
FIG. 1 is a simplified pictorial illustration of a point of sale terminal constructed and operative in accordance with a preferred embodiment of the present invention.
Figure 2:
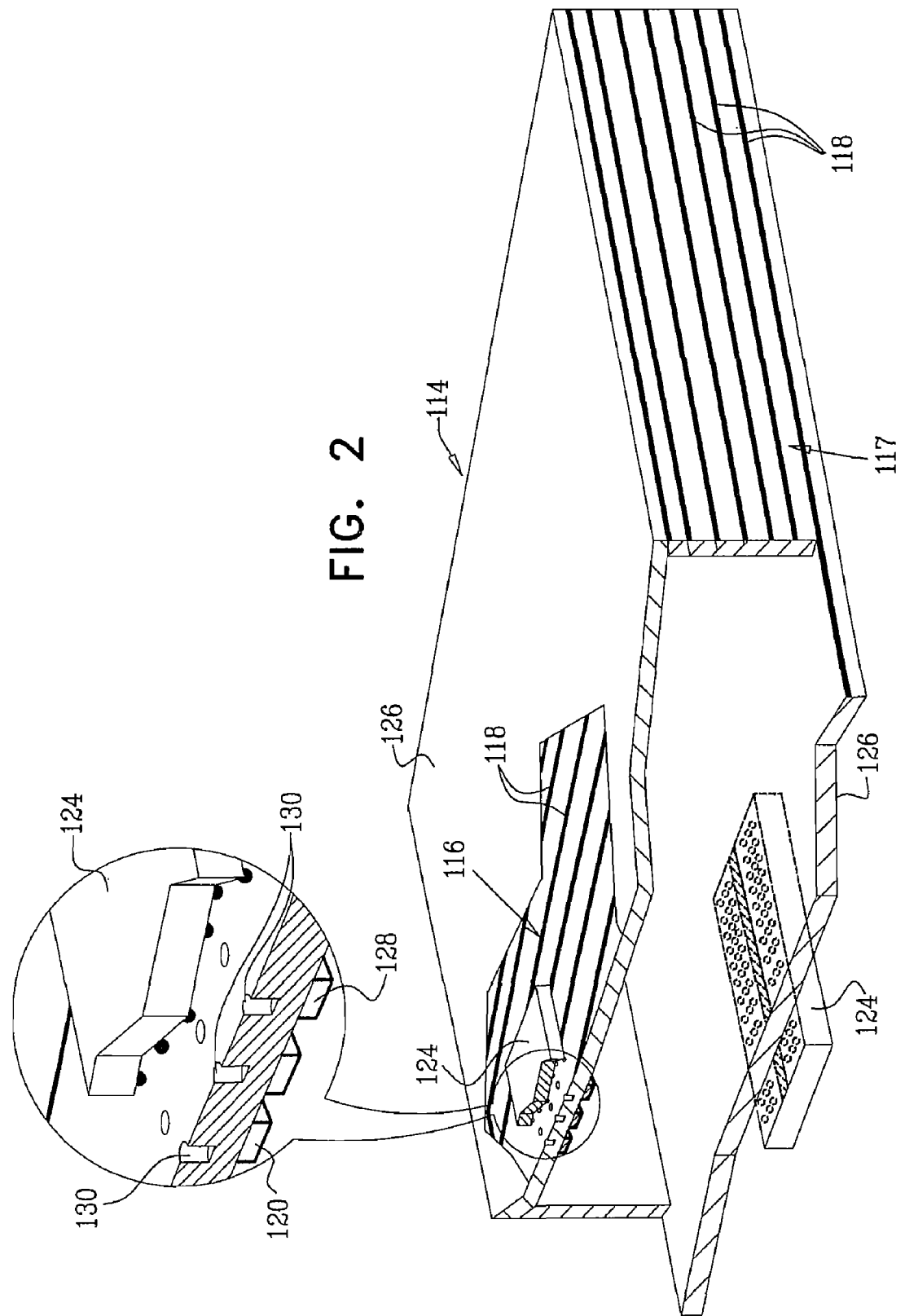
FIG. 2 is a partially cut-away simplified pictorial illustration of an anti-tamper protected enclosure forming part of the point of sale terminal of FIG. 1.

Reference is now made to FIGS. 1 & 2, which are a simplified pictorial illustration of a point of sale terminal 100 and a partially cut-away simplified pictorial illustration of an anti-tamper protected enclosure forming part of the point of sale terminal 100 constructed and operative in accordance with a preferred embodiment of the present invention. The point of sale terminal of FIG. 1 preferably includes a housing 110 and a data entry element, such as a keyboard 112, mounted in the housing. Preferably an anti-tamper protected enclosure 114 is located within the housing 110 and includes one or more conductor networks, such as networks 116 and 117, of embedded electrical conductors 118 which are electrically connected to anti-tamper protection circuitry 120, typically in the form of an integrated circuit located within the anti-tamper protected enclosure 114.

Anti-tamper protected enclosure 114 may be formed of any suitable material. For example, it may be formed of a plurality of printed circuit boards wherein the conductor networks are defined by conductors 118 formed on one or more layers thereof, preferably including embedded layers. As an alternative, a rigid or non-rigid enclosure may be provided and wrapped in one or more layers of flexible circuit boards having formed thereon or imbedded therein one or more conductor networks.

In accordance with a preferred embodiment of the present invention, at least one ball grid array device 124, which includes encapsulation which provides enhanced physical protection, is arranged within the housing 110 and mounted on an outer surface 126 of the anti-tamper protected enclosure 114. The ball grid array device 124 preferably is electrically coupled to the anti-tamper protection circuitry and to conductor network or conductor networks 116 and 117 for protecting against unauthorized access to the anti-tamper protected enclosure 114 and more specifically against access to critical circuit elements, such as data storage elements 128, anti-tamper protection circuitry 120 and electrical connections, such as vias 130 thereto. It is appreciated that were such critical circuit elements accessible to an unauthorized person, highly confidential information, such as encryption keys and personal identification information, could be compromised.

In the illustrated embodiment of FIGS. 1 & 2, two ball grid array devices 124 are provided on two oppositely facing outside surfaces of protected enclosure 114. It is appreciated that a greater or lesser number of ball grid array devices 124 may be employed on any suitable surface of the enclosure 114, in accordance with the circuit layout therein. Preferably, the placement of the ball grid array devices 124 is such that they physically overlie critical circuit elements mounted or otherwise located at generally the same location.

Figure 3:
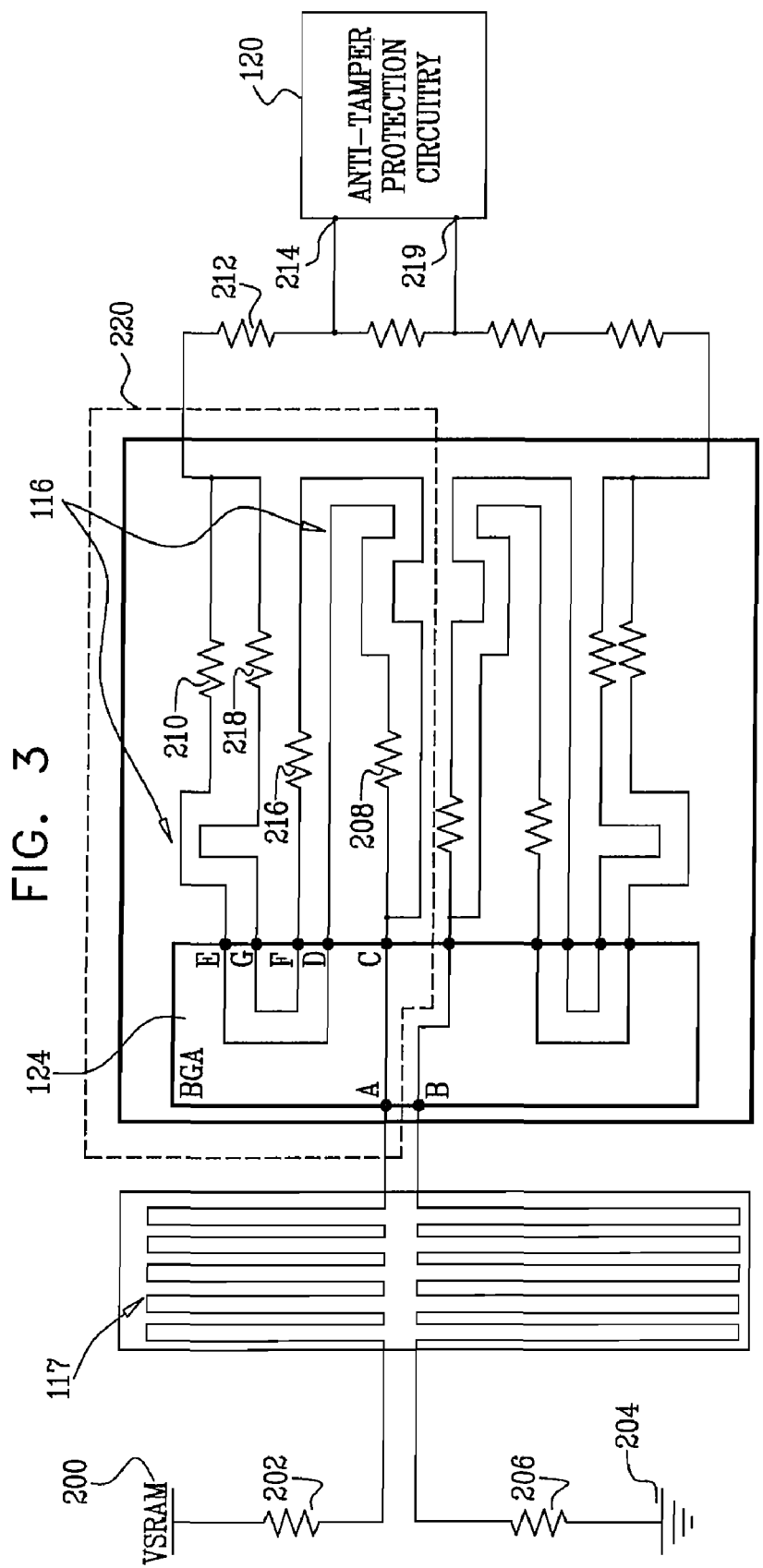
FIG. 3 is a simplified circuit diagram of electrical connections to anti-tamper protection circuitry employed in the point of sale terminal of FIGS. 1 & 2.
Figure 4:
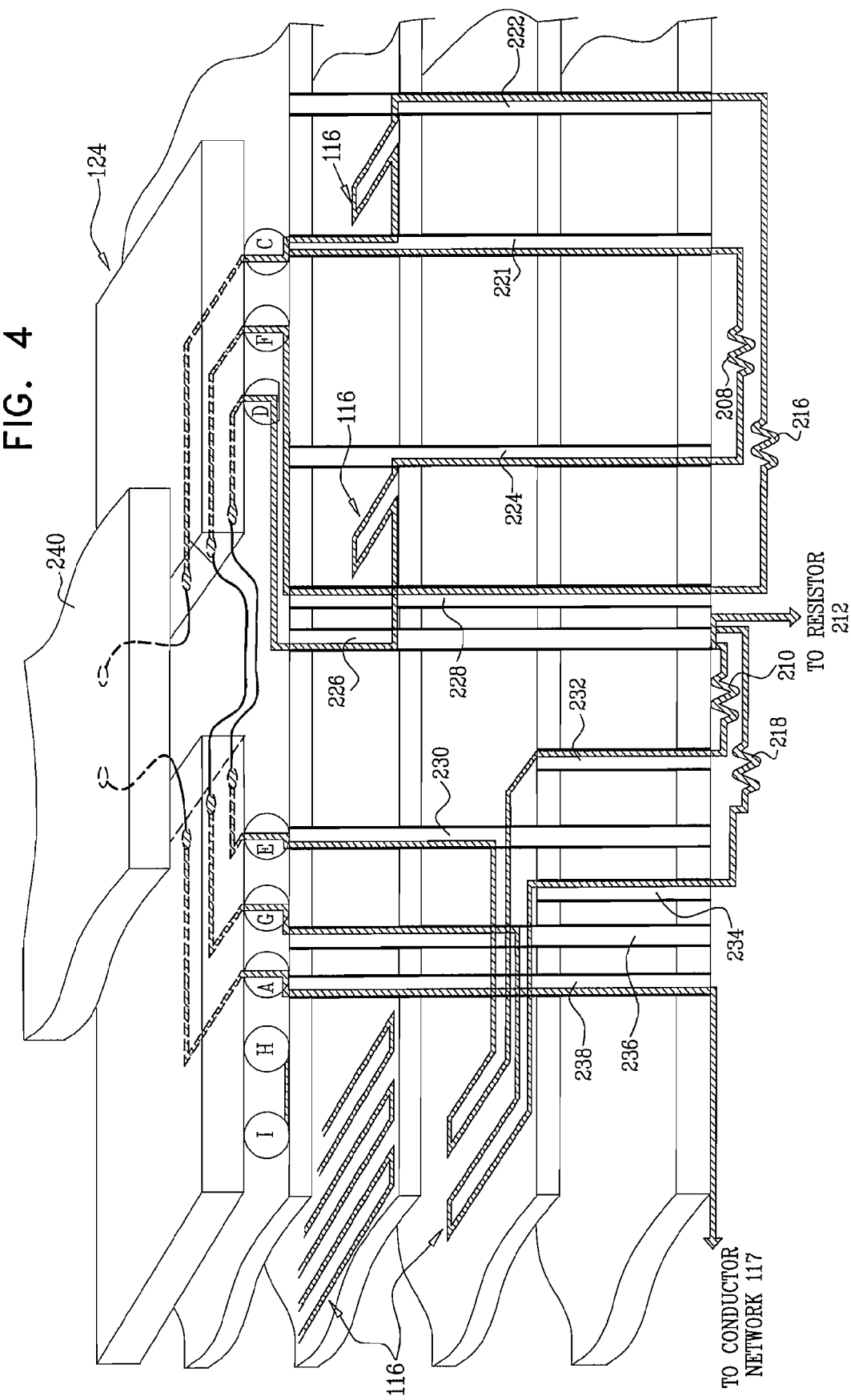
FIG. 4 is a simplified, generalized illustration of part of the circuitry of FIG. 3.

Reference is now made to FIGS. 3 and 4, which illustrate a preferred arrangement of electrical connections to anti-tamper protection circuitry 120. It is seen that preferably there is provided a pair of electrically parallel conductive pathways, each providing a connection extending between a voltage source across one or more conductor networks 117 of embedded electrical conductors, across various conductive paths at least partially defined by the ball grid array device and by one or more conductor networks 116, including selected resistances, to inputs of anti-tamper protection circuitry 120. Anti-tamper protection circuitry 120 preferably includes a comparison circuit which compares the impedance along the parallel pathways such that any physical tampering with the ball grid array device will result in an alarm indication being produced by anti-tamper protection circuitry 120. Anti-tamper protection circuitry 120 may take protective steps, such as disabling the point of sale terminal, erasure of all data on data storage elements 128 and sending a tamper alert message.

It is appreciated that the arrangement of the various conductive paths defined by the ball grid array device 124 may be arbitrary but preferably includes conductive paths interconnecting balls which do not lie at the periphery of the ball grid array device. It is appreciated that not all balls necessarily form part of the connections.

In the illustrated example of FIG. 3, a DC voltage source VSRAM 200 is provided, typically at a voltage of 3.3 Volts, and is coupled in series via a resistor 202 and via a first conductor network 117 to a ball A forming part of ball grid array device 124. A ground connection 204 is coupled in series via a resistor 206 and via another conductor network 117 to a ball B of ball grid array device 124.

Ball A is electrically connected within the ball grid array device 124, preferably by wire bonding, to a ball C of the ball grid array device 124. Ball C is connected in series via a resistor 208 and via a portion of a conductor element 116 to a ball D of ball grid array device 124. Ball D is electrically connected, preferably by wire bonding, to a ball E of the ball grid array device 124. Ball E is connected via a portion of conductor network 116 in series via a resistor 210 and a resistor 212 to a first input terminal 214 of anti-tamper protection circuitry 120.

Ball C is connected via a portion of conductor network 116 in series via a resistor 216 to a ball F of the ball grid array device 124. Ball F is electrically connected, preferably by wire bonding, to a ball G of the ball grid array device 124. Ball G is connected via a portion of conductor network 116 in series via a resistor 218 and via resistor 212 to the first input terminal 214 of anti-tamper protection circuitry 120.

Circuitry which is similar or identical to that described hereinabove may be connected between ball B and a second input terminal 219 of anti-tamper protection circuitry 120.

A portion 220 forming part of one of the parallel pathways in the above-described circuitry is shown in detail in FIG. 4. FIG. 4 illustrates, in somewhat expanded form, for the sake of clarity, a four layer PCB, which typically forms a wall of the enclosure 114 (FIGS. 1 & 2) onto which ball grid array device 124 (FIGS. 1 & 2) is mounted.

It is seen in FIG. 4 that a series connection between resistor 208 and ball C passes along a plated through hole (PTH) via 221. A series connection between resistor 216 and ball C passes along a PTH via 222 and via a portion of conductor network 116. A series connection between resistor 208 and ball D passes along a PTH via 224, via a portion of conductor network 116 and along a PTH via 226. A series connection between resistor 216 and ball F passes along a PTH via 228. A series connection between ball E and resistor 210 passes along a PTH via 230, along a portion of conductor network 116 and along a blind via 232. A series connection between resistor 218 and ball G passes along a blind via 234, along a portion of conductor network 116 and along a PTH via 236. A series connection between ball A and resistor 202 passes along a PTH via 238 and along a conductor network 117. A series connection is also provided between resistor 212 and parallel resistors 210 and 218.

Ball A is connected to ball C within the ball grid array device 124, preferably by wire bonding, via an aluminum conductor 240. Ball G is connected to ball F within the ball grid array device 124, preferably by wire bonding. Ball E is connected to ball D within the ball grid array device 124, preferably by wire bonding.

Preferably, the ball grid array device 124 is placed at a location overlying the various vias, as shown, which substantially inhibits unauthorized access to those vias.

It is appreciated that multiple circuits similar to the circuitry described hereinabove may be provided. It is also appreciated that the printed circuit boards may be of any suitable number of layers, preferably two layers or more. It is additionally appreciated that the ball grid array device may be employed to provide protection to various types of vias carrying sensitive signals, such as through vias, blind vias and buried vias.

According to an alternative embodiment, the conductor network may be obviated and the ball grid array device is connected directly to the tamper-detection circuitry. According to another alternative embodiment, various conductor networks may be connected to various voltage sources, each of a different voltage.

It will be appreciated by persons skilled in the art that the present invention is not limited by what has been particularly shown and described hereinabove. Rather the scope of the present invention includes both combinations and sub-combinations of various feature of the invention and modifications thereof which may occur to persons skilled in the art upon reading the foregoing description and which are not in the prior art.

The invention claimed is:

1. A device for containing sensitive data comprising:
   a housing;
   an anti-tamper protected enclosure located within said housing and being adapted to contain said sensitive data;

anti-tamper protection circuitry located within said anti-tamper protected enclosure;

at least one ball grid array device arranged within said housing and mounted on an outer surface of said anti-tamper protected enclosure, said at least one ball grid array device including a multiplicity of balls, at least a plurality of which are electrically coupled to said anti-tamper protection circuitry for protecting against unauthorized access to the interior of said anti-tamper protected enclosure;

wherein said at least one ball grid array device includes balls which are not electrically connected to said anti-tamper protection circuitry; and wherein said anti-tamper protection circuitry is operative, in an event of physical tampering with at least one of said at least one ball grid array device, to perform at least one of the following actions: generate an alarm indication, disable the device and erase said sensitive data.

2. The device according to claim 1, and also comprising a confidential data storage element located within said anti-tamper protected enclosure.

3. The device according to claim 1, wherein said at least one ball grid array device includes wire-bonded circuitry.

4. The device according to claim 1, wherein said anti-tamper protected enclosure includes at least one conductor network which is electrically coupled to said anti-tamper protection circuitry.

5. The device according to claim 4, wherein said anti-tamper protection circuit is coupled to said at least one conductor network via said at least one ball grid array device.

6. The device according to claim 5, wherein said anti-tamper protection circuitry is coupled to said at least one conductor network by electrical connections extending through vias which are physically protected by said at least one ball grid array device.

7. The device according to claim 1, wherein a physical location of said at least one ball grid array device is selected to provide physical protection to at least one electrical connection within said anti-tamper protected enclosure.

8. The device according to claim 1, wherein said anti-tamper protected enclosure comprises at least one flexible printed circuit board.

9. The device according to claim 1, wherein said anti-tamper protected enclosure comprises at least one rigid printed circuit board.

10. The device according to claim 1, wherein said device is a point of sale terminal.

11. An anti-tamper protected enclosure comprising:
anti-tamper protection circuitry located within said anti-tamper protected enclosure;

at least one ball grid array device mounted on an outer surface of said anti-tamper protected enclosure, said at least one ball grid array device including a multiplicity of balls, at least a plurality of which are electrically coupled to said anti-tamper protection circuitry for protecting against unauthorized access to the interior of said anti-tamper protected enclosure;

wherein said at least one ball grid array device includes balls which are not electrically connected to said anti-tamper protection circuitry; and wherein said anti-tamper protection circuitry is operative, in an event of physical tampering with at least one of said at least one ball grid array device, to generate an alarm indication.

12. The anti-tamper protected enclosure according to claim 11, and also comprising a confidential data storage element located within.

13. The anti-tamper protected enclosure according to claim 11, including at least one conductor network which is electrically coupled to said anti-tamper protection circuitry.

14. The anti-tamper protected enclosure according to claim 13, wherein said anti-tamper protection circuitry is coupled to said at least one conductor network via said at least one ball grid array device.

15. The anti-tamper protected enclosure according to claim 14, wherein said anti-tamper protection circuitry is coupled to said at least one conductor network by electrical connections extending through vias which are physically protected by said at least one ball grid array device.

16. The anti-tamper protected enclosure according to claim 11, wherein a physical location of said at least one ball grid array device is selected to provide physical protection to at least one electrical connection within said anti-tamper protected enclosure.

17. The anti-tamper protected enclosure according to claim 11, wherein said anti-tamper protected enclosure comprises at least one flexible printed circuit board.

18. The anti-tamper protected enclosure according to claim 11, wherein said anti-tamper protected enclosure comprises at least one rigid printed circuit board.

19. The anti-tamper protected enclosure according to claim 1, wherein said anti-tamper protection circuitry includes a comparison circuit.

20. The anti-tamper protected enclosure according to claim 11, wherein said at least one ball grid array device includes wire-bonded circuitry.

* * * * *